(12) United States Patent
Salsbury et al.

(10) Patent No.: US 11,614,247 B2
(45) Date of Patent: Mar. 28, 2023

(54) SELF-LEARNING WIRELESS THERMOSTAT THAT MINIMIZES BATTERY DRAIN

(71) Applicant: Johnson Controls Technology Company, Auburn Hills, MI (US)

(72) Inventors: Timothy I. Salsbury, Mequon, WI (US); John M. House, Saint-Leonard (CA); Carlos Felipe Alcala Perez, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 542 days.

(21) Appl. No.: 16/711,890

(22) Filed: Dec. 12, 2019

(65) Prior Publication Data

US 2021/0180811 A1 Jun. 17, 2021

(51) Int. Cl.
| | |
|---|---|
| *F24F 11/30* | (2018.01) |
| *G06N 20/00* | (2019.01) |
| *G05B 15/02* | (2006.01) |
| *F24F 11/64* | (2018.01) |
| *F24F 11/65* | (2018.01) |
| *F24F 11/58* | (2018.01) |
| *H04B 1/10* | (2006.01) |
| *G05D 23/19* | (2006.01) |
| *H04W 52/02* | (2009.01) |
| *F24F 110/10* | (2018.01) |

(52) U.S. Cl.
CPC .............. *F24F 11/30* (2018.01); *F24F 11/58* (2018.01); *F24F 11/64* (2018.01); *F24F 11/65* (2018.01); *G05B 15/02* (2013.01); *G05D 23/1927* (2013.01); *G06N 20/00* (2019.01); *H04B 1/10* (2013.01); *H04B 1/1027* (2013.01); *H04W 52/0251* (2013.01); *F24F 2110/10* (2018.01)

(58) Field of Classification Search
CPC .......................... A61B 2050/105; G05D 23/02
USPC .............................. 700/32, 276, 46; 340/628
See application file for complete search history.

(56) References Cited

U.S. PATENT DOCUMENTS

| | | | | |
|---|---|---|---|---|
| 2014/0358293 | A1* | 12/2014 | Fadell | ..................... G01J 5/041 |
| | | | | 700/276 |
| 2018/0156487 | A1* | 6/2018 | Beitelmal | ................ F24F 11/65 |
| 2018/0308305 | A1* | 10/2018 | Austen | ................ B60R 25/2018 |

* cited by examiner

*Primary Examiner* — Kiet M Doan
(74) *Attorney, Agent, or Firm* — Foley & Lardner LLP

(57) ABSTRACT

A method of controlling signal transmission in a building control system including measuring a number of signal values associated with an environmental variable using a sensor of a wireless device, dynamically determining, by the wireless device, a noise threshold based on the number of signal values, combining a first signal value and a second signal value of the number of signal values using a mathematical relationship to determine a result associated with the first signal value and the second signal value, and periodically transmitting the first signal value from the wireless measurement device to a controller in response to the result exceeding the noise threshold.

23 Claims, 10 Drawing Sheets

SELF-LEARNING WIRELESS THERMOSTAT THAT MINIMIZES BATTERY DRAIN

BACKGROUND

The present application relates generally to methods for managing building systems. The present application relates more particularly to systems and methods for conserving power when transmitting sensor data to a building management system.

A building management system (BMS) is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof. Wireless devices such as wireless sensors may use a large portion of battery life transmitting data.

Conventional methods of transmitting data from wireless sensors may include measuring and transmitting one value at a time. The collection and transmission interval may align with the controller update period, providing a responsive system. However, battery life may diminish quickly. It may be desirable to provide a method for wirelessly transmitting sensor data which overcomes some of the disadvantages of established methods.

SUMMARY

One implementation of the present disclosure is a method of controlling signal transmission in a building control system including measuring a number of signal values associated with an environmental variable using a sensor of a wireless device, dynamically determining, by the wireless device, a noise threshold based on the number of signal values, combining a first signal value and a second signal value of the number of signal values using a mathematical relationship to determine a result associated with the first signal value and the second signal value, and periodically transmitting the first signal value from the wireless measurement device to a controller in response to the result exceeding the noise threshold.

In some embodiments, the environmental variable is a temperature. In some embodiments, the wireless measurement device is a thermostat. In some embodiments, the wireless measurement device is a battery operated device. In some embodiments, the controller applies the first signal value as input to a control algorithm that operates to control the environmental variable. In some embodiments, the noise threshold is a dynamic noise threshold that changes over time based on subsequent measurements of the environmental variable. In some embodiments, the result is a difference between the first signal value and the second signal value. In some embodiments, the results is a ratio between the first signal value and the second signal value.

Another implementation of the present disclosure is a wireless device including a sensor configured to measure an environmental variable, a wireless radio configured to wirelessly transmit a message, and a processing circuit having a processor and memory, the memory storing instructions that, when executed by the processor, cause the processing circuit to receive, from the sensor, a number of signal values associated with the environmental variable, dynamically determine a noise threshold based on the number of signal values, combine a first signal value and a second signal value of the number of signal values using a mathematical relationship to determine a result associated with the first signal value and the second signal value, and cause the wireless radio to transmit the first signal value in response to the result exceeding the noise threshold.

In some embodiments, the wireless radio transmits the first signal value to a controller. In some embodiments, the controller applies the first signal value as input to a control algorithm that operates to control the environmental variable. In some embodiments, the environmental variable is a temperature. In some embodiments, the wireless measurement device is a thermostat. In some embodiments, the wireless measurement device is battery operated. In some embodiments, the noise threshold is a dynamic noise threshold that changes over time based on subsequent measurements of the environmental variable. In some embodiments, the result is a difference between the first signal value and the second signal value. In some embodiments, the result is a ratio between the first signal value and the second signal value.

Another implementation of the present disclosure is a building management system (BMS) including a controller configured to control an environmental variable of a building and a wireless device configured to measure a number of signal values associated with the environmental variable, dynamically determine a noise threshold based on the number of signal values, combine a first signal value and a second signal value of the number of signal values using a mathematical relationship to determine a result associated with the first signal value and the second signal value, transmit the first signal value to the controller in response to the result exceeding the noise threshold.

In some embodiments, in response to receiving the first signal value from the wireless measurement device, the controller is further configured to apply the first signal value as input to a control algorithm that operates to control the environmental variable of the building. In some embodiments, the environmental variable is a temperature. In some embodiments, the wireless measurement device is a thermostat. In some embodiments, the thermostat is battery operated. In some embodiments, the first signal value is a current measurement of the temperature and the second signal value is a past measurement of the temperature. In some embodiments, the noise threshold is a dynamic noise threshold that changes over time based on subsequent measurements of the environmental variable. In some embodiments, the result is a difference between the first signal value and the second signal value. In some embodiments, the result is a ratio between the first signal value and the second signal value.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
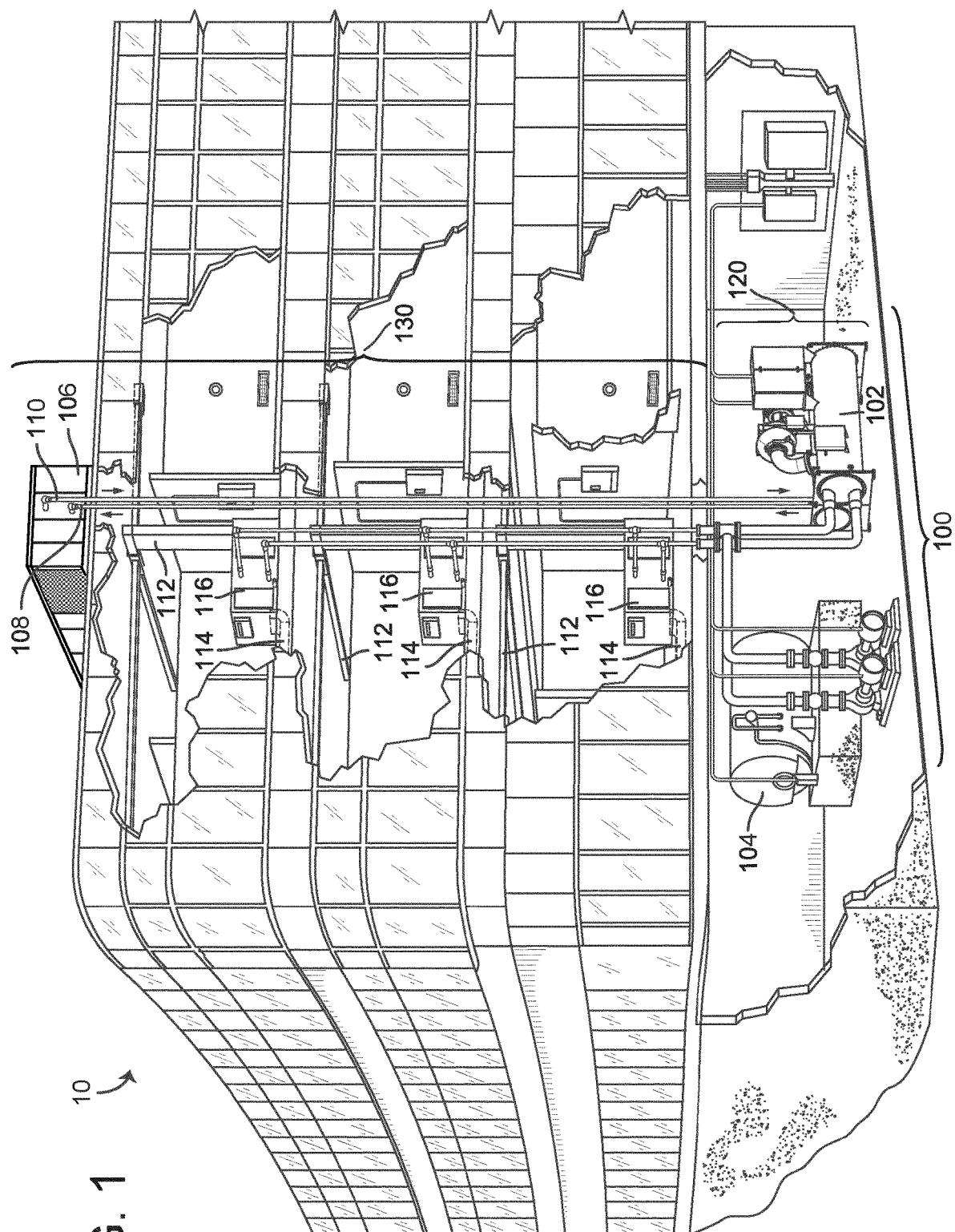
FIG. 1 is a drawing of a building equipped with a HVAC system in which the systems and method of the present disclosure may be implemented, according to an exemplary embodiment.

Referring generally to the FIGURES, a building management system, feedback controller, and components thereof are shown according to various exemplary embodiments. Some types of feedback control leverage measurements to make decisions about how to manipulate the inputs of a system so that the controlled system achieves an expected or desirable behavior. Traditionally, wired sensors are used in feedback control systems. However, with the increasing availability and capacity of wireless sensors and wireless communication networks, wireless sensors are becoming a viable alternative to wired sensors.

In a building HVAC system, wireless sensors may be used to monitor a variety of building conditions such as temperature, humidity, pressure, airflow, etc. For example, a wireless temperature sensor may be used to measure the temperature of a building zone and send zone temperature measurements to a feedback controller. The controller subsequently computes control inputs that ensure the zone temperature (i.e., the measured variable) is maintained at a zone temperature set point.

While wireless sensors are currently available, many wireless sensors suffer from a short battery life. One of the major challenges of using battery-powered wireless sensors within feedback control applications is that the battery power consumption required to transmit the measurement to the controller may be significant. However, a wireless sensor may use significantly less power when recording measurements than it uses when transmitting a message to a feedback controller. The present disclosure offers systems and methods of analysis to reduce the quantity of transmissions to reduce power consumption and data traffic.

Certain methods of transmitting data from wireless sensors may include measuring and transmitting one value at a time. The collection and transmission interval may align with the controller update period, providing a responsive system, in some embodiments. However, battery life may diminish quickly. In some embodiments, a method of wirelessly transmitting sensor data overcomes some of the disadvantages of transmitting data and reduction of battery life.

One technique for increasing the battery life of a wireless sensor is to decrease the frequency of transmissions from the wireless sensor to the controller. However, many feedback control systems can require the measured variable be measured (or sampled) and fed back to the controller at a sufficiently fast sampling rate relative to the dominant time constant of the system (i.e., the time constant of the dominant dynamic behavior of the system). For example, for zone temperature control, the zone temperature may be sampled (i.e., measured) every minute and transmitted to the controller each minute. Sampling the measured variable less frequently (i.e., increasing the time interval between consecutive measurements) may lead to substantial control performance degradation. In other words, many feedback controllers require a new sample of the measured variable at relatively short intervals (e.g., a new sample each minute) to achieve desirable control performance.

Advantageously, some embodiments of the systems and methods described herein can be used to extend the battery life of wireless sensors (and other wireless devices that transmit measurements) without sacrificing control performance. For example, a wireless measurement device may record measurements of a measured variable at a regular measurement interval (e.g., one measurement per minute). The wireless device may use a series of measurements to determine a threshold value for the measured variable and may limit transmissions to measurements whose difference from previously transmitted measurements exceed the threshold. In some embodiments, multiple values may be sent to the controller in a single message each time the wireless device transmits, thereby reducing the number of transmissions needed. By incorporating advanced algorithms for determining a threshold value, the proposed systems and methods of the present disclosure may increase the transmission interval, thereby reducing power consumption and data traffic.

Some embodiments, provide reduced transmission frequency and therefore increased wireless device battery life. The wireless device may determine which measurements represent a meaningful difference from previously transmitted measurements. For example, if a room temperature remains at a steady state temperature, a measurement may be conserved by the system (e.g., the system will not send the measurement). However, if the room temperature changes meaningfully then the system will send the new room temperature measurement. Furthermore, the system eliminates or reduces a need to make configuration changes to a system controller. For example, wireless devices having the reduced transmission frequency system described herein may be used with existing building controllers without modification of the existing building controllers, thereby offering large cost savings for installation.

Before discussing the FIGURES in detail, it should be noted that the examples provided in the present disclosure are illustrative only and are not limitations on the scope of invention. For example, a one minute sampling interval is used in several of the examples provided herein to simplify the presentation of the calculations and algorithms. However, it is contemplated that any of a variety of sampling intervals can be used (e.g., one second, one minute, three minutes, five minutes, one hour, etc.) in addition to those specifically described herein without departing from the scope of the present disclosure.

Building Management System and HVAC System

Referring now to FIGS. 1-4, an exemplary building management system (BMS) and HVAC system in which the systems and methods may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, valves, roof top units, air conditioners, humidifiers, dehumidifiers, ventilators, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
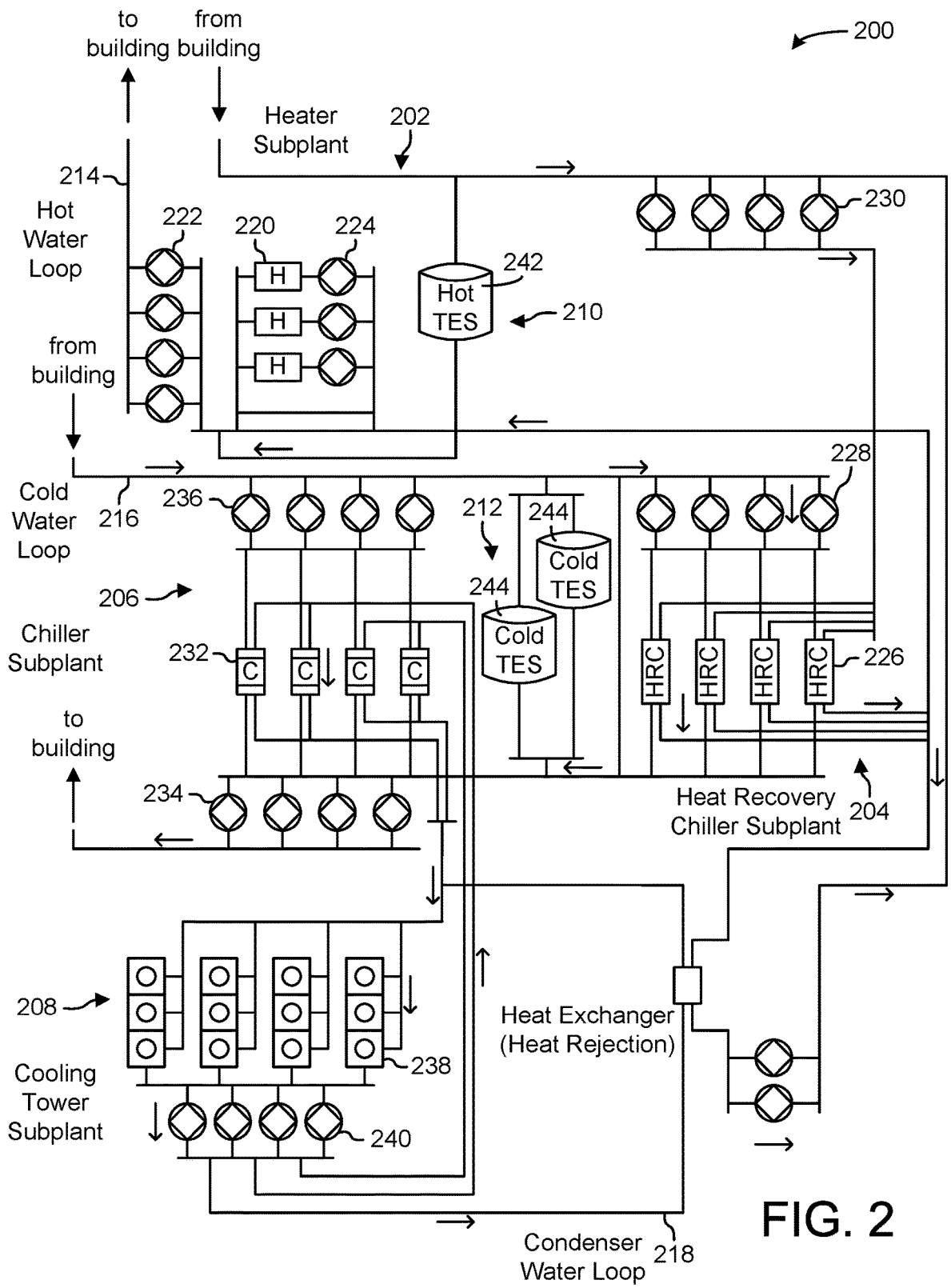
FIG. 2 is a block diagram of a waterside system which may be used in conjunction with the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
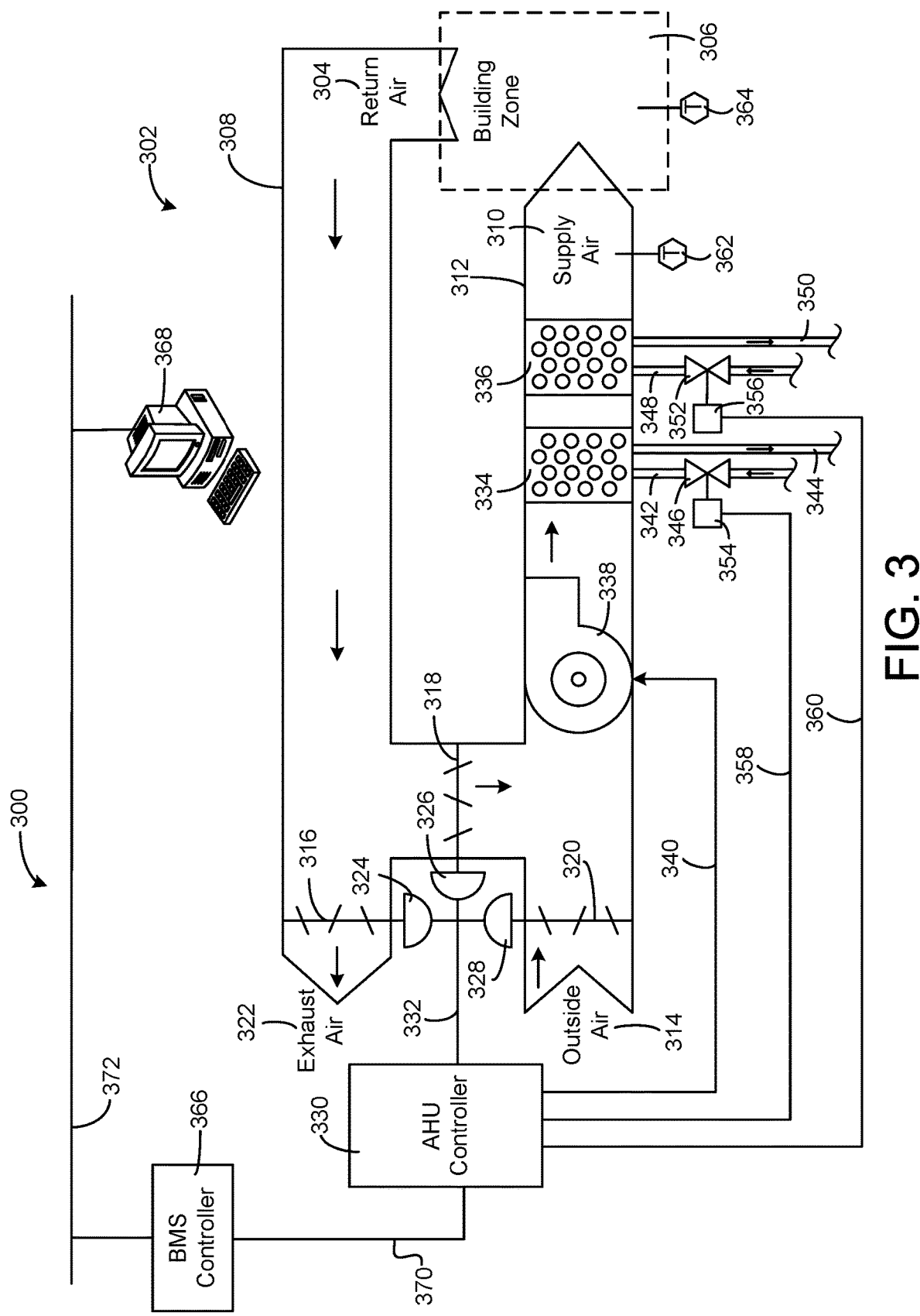
FIG. 3 is a block diagram of an airside system which may be used in conjunction with the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set point temperature for supply air 310 or to maintain the temperature of supply air 310 within a set point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, set points, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
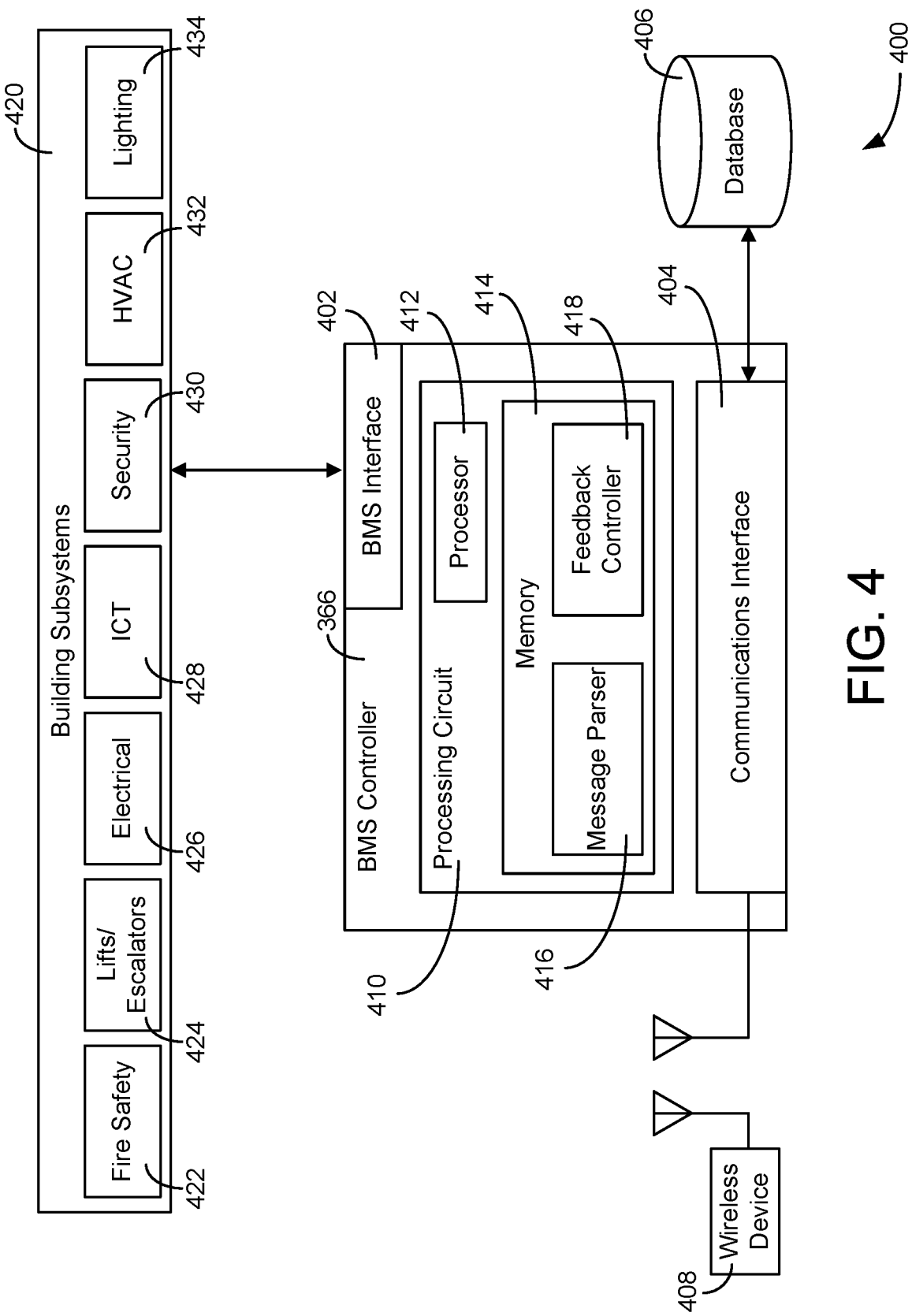
FIG. 4 is a block diagram of a building management system in which the systems and methods of the present disclosure may be implemented, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 420. Building subsystems 420 are shown to include a fire safety system 422, a lift/escalators subsystem 424, a building electrical subsystem 426, an information communication technology (ICT) subsystem 428, a security subsystem 430, a HVAC subsystem 432, and a lighting subsystem 434. In various embodiments, building subsystems 420 may include fewer, additional, or alternative subsystems. For example, building subsystems 420 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 420 include waterside system 200 and/or airside system 300, as described with reference to FIGS. 2-3.

Each of building subsystems 420 may include any number of devices, controllers, and connections for completing its individual functions and control activities. HVAC subsystem 432 may include many of the same components as HVAC system 100, as described with reference to FIGS. 1-3. For example, HVAC subsystem 432 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 434 may include any number of light fixtures, ballasts, lighting sensors, dimmers, or other devices configured to controllably adjust the amount of light provided to a building space. Security subsystem 430 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 404 and a BMS interface 402. Interface 404 may facilitate communications between BMS controller 366 and external applications (e.g., monitoring and reporting applications, enterprise control applications, remote systems and applications, applications residing on client devices, etc.) for allowing user control, monitoring, and adjustment to BMS controller 366 and/or subsystems 420. Interface 404 may also facilitate communications between BMS controller 366 and the client devices. BMS interface 402 may facilitate communications between BMS controller 366 and building subsystems 420 (e.g., HVAC, lighting, security, lifts, power distribution, business, etc.).

Interfaces 402 and 404 may be or include wired or wireless communications interfaces (e.g., jacks, antennas, transmitters, receivers, transceivers, wire terminals, etc.) for conducting data communications with building subsystems 420 or other external systems or devices. In various embodiments, communications via interfaces 402 and 404 may be direct (e.g., local wired or wireless communications) or via a communications network (e.g., a WAN, the Internet, a cellular network, etc.). For example, interfaces 402 and 404 may include an Ethernet card and port for sending and receiving data via an Ethernet-based communications link or network. In another example, interfaces 402 and 404 may include a WiFi transceiver for communicating via a wireless communications network. In another example, one or both of interfaces 402 and 404 may include cellular or mobile phone communications transceivers. In one embodiment, communications interface 404 is a power line communications interface and BMS interface 402 is an Ethernet interface. In other embodiments, both communications interface 404 and BMS interface 402 are Ethernet interfaces or are the same Ethernet interface.

BMS controller 366 may communicate with a wireless device 408. In some embodiments, device 408 includes a wireless sensor. For example, device 408 may include wireless communications abilities and may be able to transmit measured and/or predicted data values to BMS controller 366. Device 408 may be a wireless standalone sensor that is not part of another device. For example, device 408 may be a wireless sensor hidden in a wall, attached to a light fixture, etc. and may be battery operated. In some embodiments, device 408 is integrated with a subsystem of building subsystems 420. For example, device 408 may be a sensor installed in a duct of HVAC subsystem 432. Device 408 may contain one or more of a variety of sensors (e.g., temperature sensors, pressure sensors, etc.) used to monitor building 10.

In some embodiments, device 408 may be a smartphone or tablet. In other embodiments, device 408 may be a laptop or desktop computer, and may not be wireless. Wireless device 408 may be any device which is capable of communication with BMS controller 366 through communications interface 404, and is not limited to the explicitly enumerated devices. It is contemplated that wireless device 408 may communicate with building subsystems 420 directly. BMS controller 366 may transmit building data to device 408 for processing or analysis. Building data may include any relevant data obtained from a component within the building or pertaining to a portion or subsystem of the building. For example, building data may be data from sensors, status control signals, feedback signals from a device, calculated metrics, set points, configuration parameters, etc. In some implementations, building data is derived from data collected.

Wireless device 408 may transmit control data to BMS controller 366 in some embodiments. Control data may be any data which affects operation of the BMS. In some embodiments, control data may control building subsystems 420 through BMS controller 366. For example, wireless device 408 may send a signal with a command to enable intrusion detection devices of security subsystem 430. Wireless device 408 may receive building data from BMS controller 366 through communications interface 404.

Still referring to FIG. 4, BMS 400 may include a database 406. Database 406 may include a history of time series values that are measured or calculated in BMS 400. For example, database 406 may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time series values that provide information about the performance of BMS 400 or a component thereof.

In some embodiments, the time series values in database 406 are measured by various sensors of BMS 400. For example, BMS 400 may include one or more temperature sensors, humidity sensors, enthalpy sensors, pressure sensors, lighting sensors, flow rate sensors, voltage sensors, valve position sensors, load sensors, resource consumption sensors, and/or any other type of sensor capable of measuring a variable of interest in BMS 400. BMS 400 may use the sensors to measure values of one or more time series variables (e.g., environmental variables, control variables, etc.) or parameters that are monitored by BMS 400. In some embodiments, the sensors may be part of device 408. BMS 400 and/or wireless device 408 may use the time series values to calculate a value for each of a plurality of times. A history of values may be stored in database 406. In some embodiments, the values in database 406 are measured values observed by sensors and/or device 408 of BMS 400. In other embodiments, the values in database 406 are provided by an external data source (e.g., data from a utility supplier).

BMS controller 366 is shown to include a processing circuit 410 including a processor 412 and memory 414. Processing circuit 410 may be communicably connected to BMS interface 402 and/or communications interface 404 such that processing circuit 410 and the various components thereof may send and receive data via interfaces 402 and 404. Processor 412 may be implemented as a general purpose processor, an application specific integrated circuit (ASIC), one or more field programmable gate arrays (FPGAs), a group of processing components, or other suitable electronic processing components.

Memory 414 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 414 may be or include volatile memory or non-volatile memory. Memory 414 may include database components, object code components, script components, or any other type of information structure for supporting the various activities and information structures described in the present application. According to an exemplary embodiment, memory 414 is communicably connected to processor 412 via processing circuit 410 and includes computer code for executing (e.g., by processing circuit 410 and/or processor 412) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). For example, BMS controller 366 may be implemented as part of a METASYS® brand building automation system, as sold by Johnson Controls Inc. In other embodiments, BMS controller 366 may be a component of a remote computing system or cloud-based computing system configured to receive and process data from one or more building management systems. For example, BMS controller 366 may be implemented as part of a PANOPTIX® brand building efficiency platform, as sold by Johnson Controls Inc. In other embodiments, BMS controller 366 may be a component of a subsystem level controller (e.g., a HVAC controller), a subplant controller, a device controller (e.g., AHU controller 330, a chiller controller, etc.), a field controller, a computer workstation, a client device, or any other system or device that receives and processes data.

Still referring to FIG. 4, memory 414 is shown to include a message parser 416 and a feedback controller 418. Modules 416 and 418 may be configured to receive inputs from building subsystems 420, wireless device 408, and other data sources, determine optimal control actions for building subsystems 420 based on the inputs, generate control signals based on the optimal control actions, and provide the generated control signals to building subsystems 420. The following paragraphs describe some of the general functions performed by each of modules 416 and 418 in BMS 400.

Message parser 416 may be configured to parse data received by BMS controller 366. For example, a message containing multiple data values (e.g., measured values and/or predicted values) may be received by BMS controller 366. Message parser 416 may be configured to parse the message and extract the multiple data values. Message parser 416 may provide one value at a time to feedback controller 418. Message parser 416 may also or alternatively be configured to flag values as measured or predicted. In yet other embodiments, message parser 416 may provide only values of a certain type to feedback controller 418. For example, message parser 416 may only provide measured values to feedback controller 418. In some embodiments, message parser 416 may organize or order data based on the values or flags associated with the values. For example, message parser 416 may rearrange the message received by BMS controller 366 such that measured values appear before predicted values, or vice versa. In some embodiments, message parser 416 may work with feedback controller 418 to optimize building performance (e.g., efficiency, energy use, comfort, or safety) based on inputs received at interface 404 and/or BMS interface 402.

Feedback controller 418 may be configured to leverage measurements to make decisions about how to manipulate the operation of BMS 400 so that BMS 400 achieves an expected or desired behavior. For example, feedback controller 418 may be able to receive inputs from message parser 416 of measured and predicted values. In some embodiments, feedback controller 418 does not need to know whether the values are measured or predicted. For example, an existing system may be able to interact with wireless device 408 without being significantly altered, or altered at all, by receiving both measured and predicted values at regular intervals without being informed of the type of each value. Feedback controller 418 may use the measured and/or predicted values as inputs to a control algorithm as if all of the values were measured. This may provide savings to consumers by reducing the amount of reconfiguration and reinstallations needed.

Wireless Device Transmission Timing

Battery life can be an important concern for wireless devices. For example, the estimated battery life of wireless devices must be known with some reasonable level of confidence in order for sales teams to engage customers, quote wireless product offerings, and estimate battery replacement intervals appropriately. A wireless device, such as a wireless thermostat, may include a radio for communication, which may communicate measurements to the controller. In many cases, radio transmissions represent the majority of operational power consumption for the wireless device. Extended battery life provides advantages to customers.

Figure 5A:
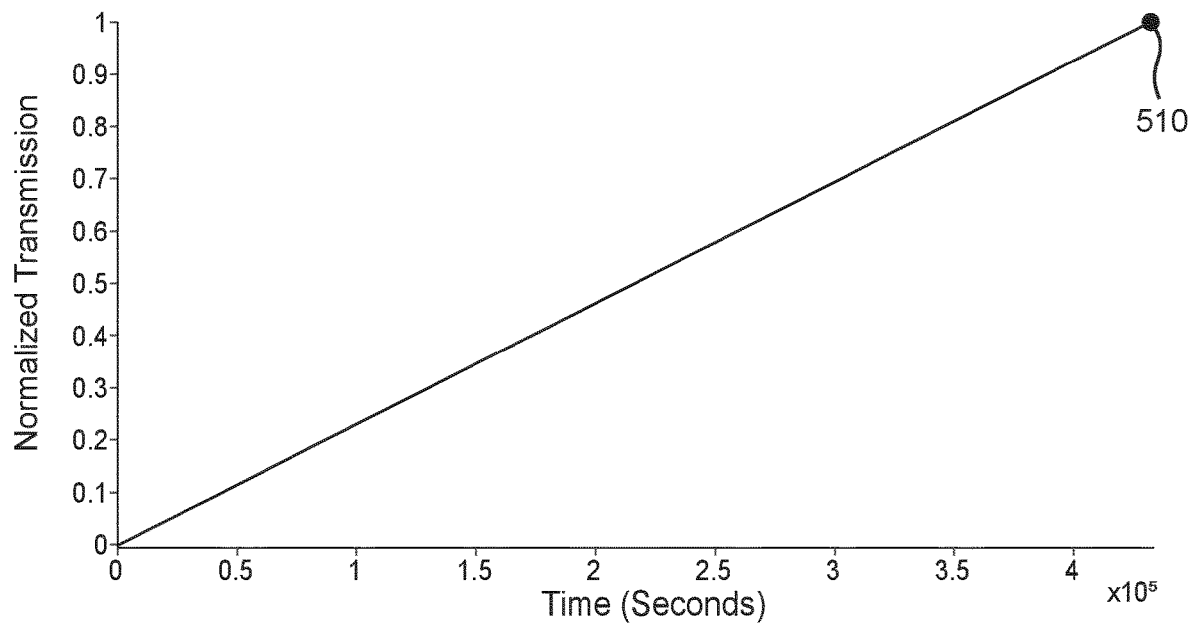
FIG. 5A is a diagram of normalized transmission frequency over time for a periodic system, according to an exemplary embodiment.
Figure 5B:
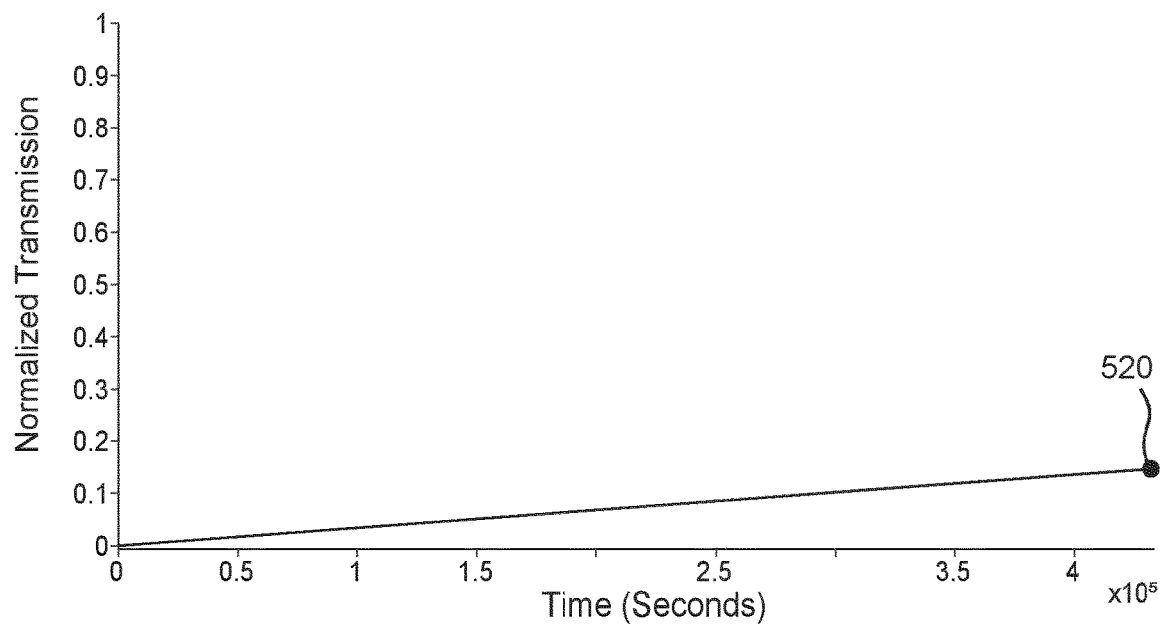
FIG. 5B is a diagram of normalized transmission frequency over time for a send on delta (SOD) system, according to an exemplary embodiment.

Traditional wireless device radios transmit one message every one or two minutes. However, transmitting one message every one or two minutes drains a wireless device battery quickly (e.g., in a matter of months or a year). Therefore, it is desirable to reduce the frequency of message transmission. System and methods of reducing the frequency of message transmission using a variable send-on-delta (SOD) system are described herein. In brief summary, the SOD system reduces the frequency of message transmission by sending data that differs from the previously sent data by a threshold. For example, a SOD system may receive and transmit a first temperature measurement of 70° F. and only transmit further temperature measurements that differ by 0.5° F. (e.g., 70.5° F. and 69.5° F. would be transmitted but 70.4° F. and 69.6° F. would not be transmitted). In a reasonably stable environment such as a HVAC controlled space, the SOD system may have significantly fewer data transmissions than a periodic (e.g., every one or more minutes) system. For example, a temperature variable in a HVAC controlled space may reach a setpoint and remain at the setpoint for a number of hours without deviating. A periodic system may transmit the temperature variable every one or two minutes during the number of hours, thereby consuming battery charge. However, a SOD system may not transmit the steady state temperature variable during the number of hours, thereby saving battery charge. For example, FIG. 5A is a graph of normalized wireless transmissions over time for a periodic system. FIG. 5B is a graph of normalized wireless transmissions over time for a SOD system. FIGS. 5A and 5B are normalized to the number of wireless transmissions from a periodic system. Point 610 represents the total number of normalized wireless transmissions over a transmission period for the periodic system. Point 520 represents the total number of normalized wireless transmissions over the same transmission period for the SOD system. Point 520 depicts ~15% of the transmissions of point 610, thereby representing ~85% reduction in transmissions by the SOD system as compared to the periodic system.

Figure 5C:
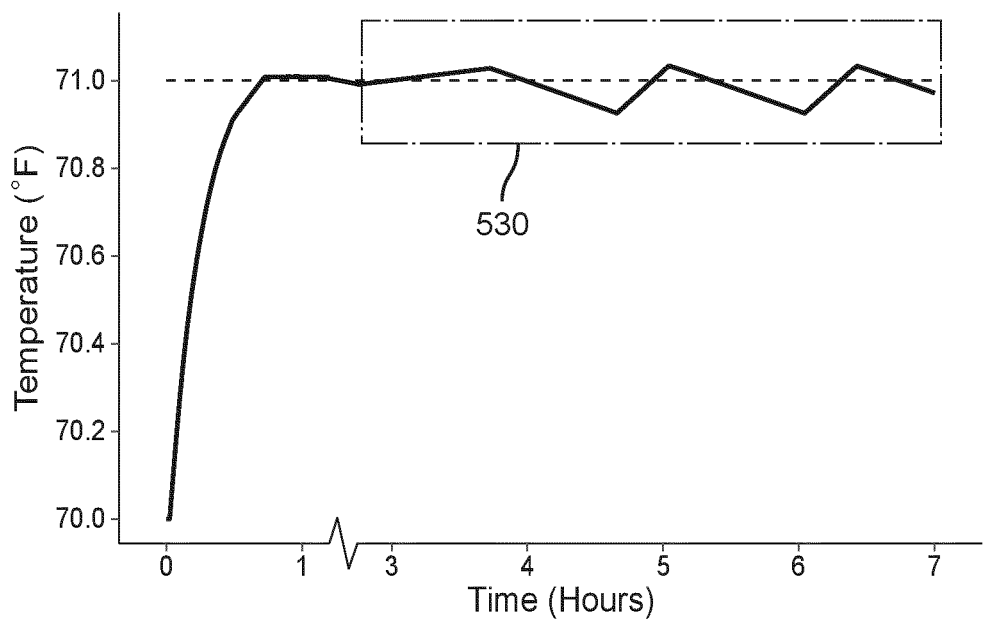
FIG. 5C is a diagram of measured variable oscillations for a static SOD system, according to an exemplary embodiment.

SOD systems may be static or variable. For example, a SOD system may have a static, unchanging threshold, or a variable, changing threshold. A static SOD system may introduce oscillations into the measured variable. For example, FIG. 5C is a graph of a measured temperature variable over time for a static SOD system. Region 530 represents introduced oscillations in the measured variable. Oscillations may degrade the performance of a system associated with the measured variable (e.g., a HVAC system). For example, oscillations may cause wear in actuators of an HVAC system leading to a reduction of their lifespan. A deadband may be introduced into the controller (e.g., feedback controller 418) to eliminate oscillations. However, introducing a deadband to a controller may require extra installation effort. Furthermore, appropriately sizing the deadband is difficult. For large systems with multiple controllers, this process becomes exceedingly difficult, if not impossible.

Figure 5D:
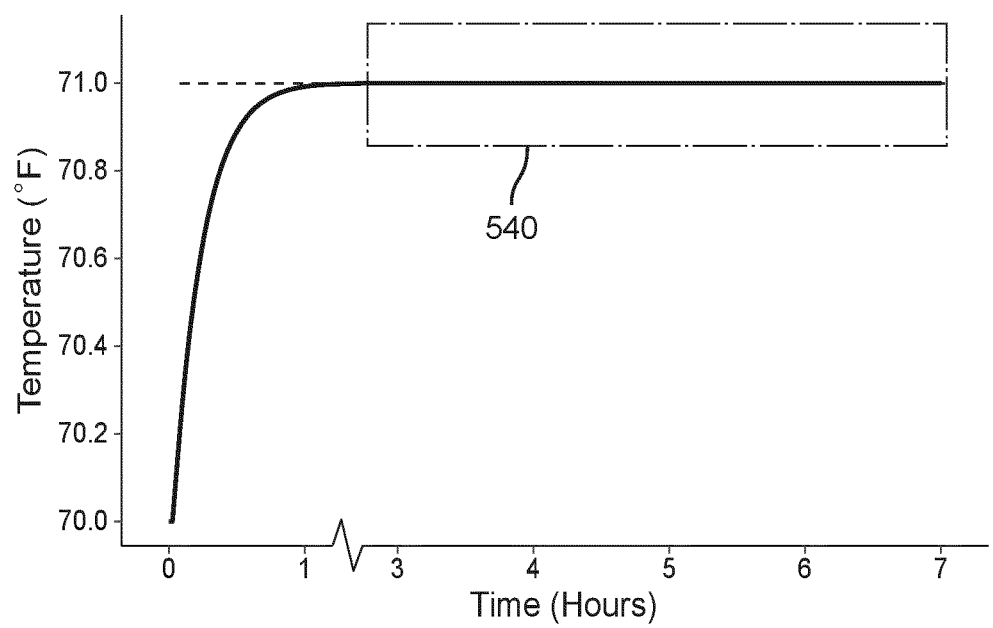
FIG. 5D is a diagram of the measured variable for a dynamic SOD system eliminating the oscillations of FIG. 5C, according to an exemplary embodiment.

A variable SOD system may eliminate oscillations. For example, FIG. 5D is a graph of a measured temperature variable over time for a variable SOD system. Region 540 represents eliminated oscillations in the measured variable. The variable SOD system may eliminate oscillations and thereby eliminate the need for a controller deadband, thereby reducing installation effort and expert maintenance. Furthermore, the variable SOD system may significantly reduce the number of data transmissions as compared to a periodic system, thereby increasing wireless device battery life.

Transmission System Architecture

Figure 6A:
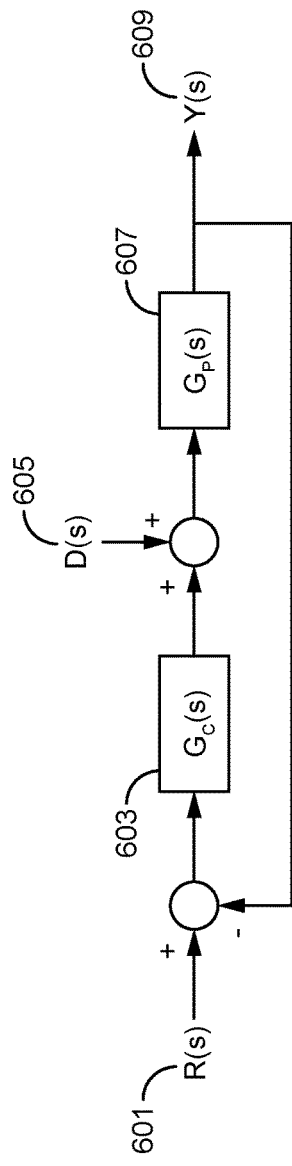
FIG. 6A is a block diagram of a control system for controlling an environmental variable, according to an exemplary embodiment.
Figure 6B:
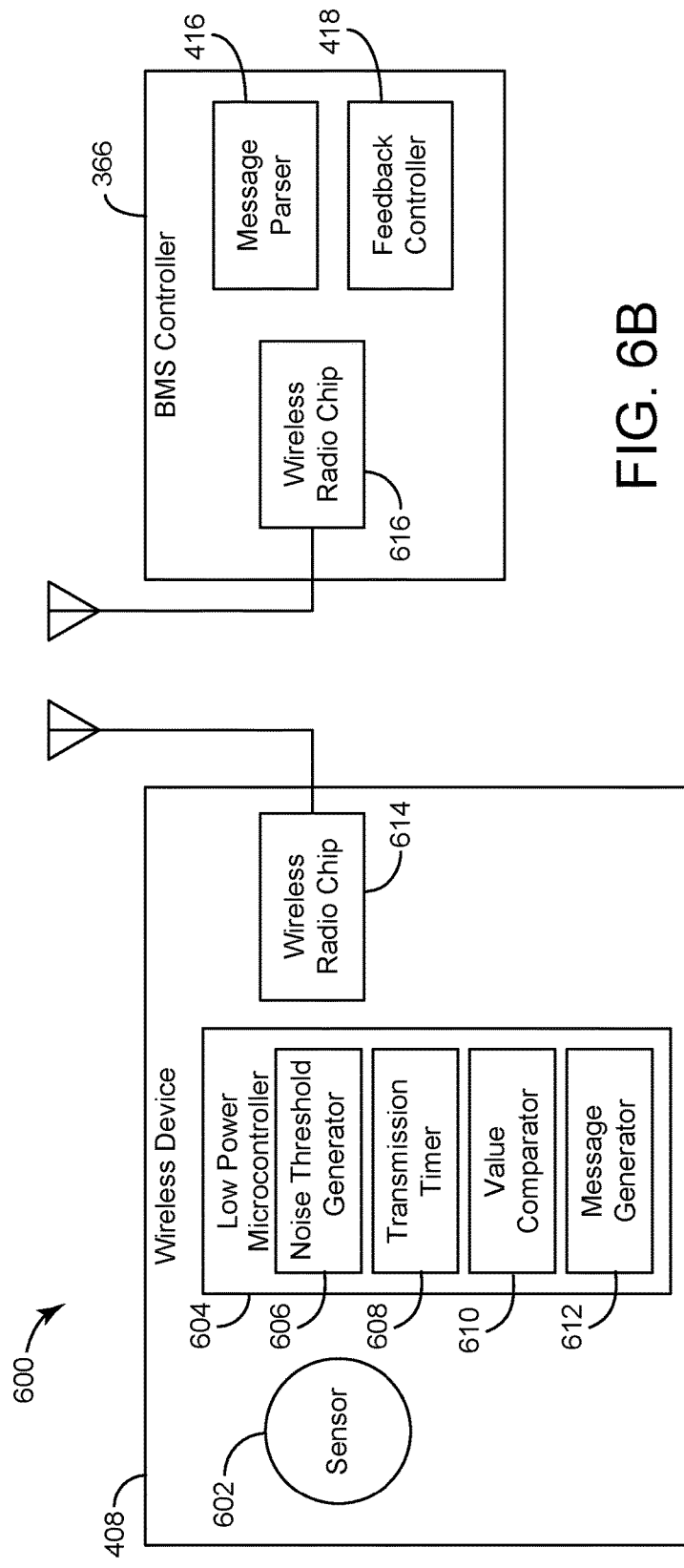
FIG. 6B is a block diagram of a system implementing a variable SOD analysis, according to an exemplary embodiment.

Referring now to FIGS. 6A-6B, system 600 for wirelessly transmitting data values of a measured variable using variable SOD analysis are shown, according an exemplary embodiment. In various embodiments, the variable SOD analysis described herein is based on the control system illustrated in FIG. 6A. For example, system 600 may at least partially implement the control system of FIG. 6A. The control system is shown to include setpoint 601. In various embodiments, setpoint 601 is the setpoint of the controlled variable (e.g., temperature, etc.). The control system may include controller transfer function 603. Controller transfer function 603 is described in greater detail below with reference to FIG. 6B. The control system may include unmeasured disturbance 605. In various embodiments, unmeasured disturbance 605 includes environmental conditions that interact with the controlled variable. For example, unmeasured disturbance 605 may include an outdoor air temperature affecting an indoor room temperature (e.g., the controlled variable). The control system may include plant transfer function 607. Plant transfer function 607 is described in greater detail below with reference to FIG. 6B. The control system may include variable 609. In some embodiments, variable 609 is a measured variable associated with the controlled variable of setpoint 601.

Referring now specifically to FIG. 6B, the transmitted data values may include measured values, predicted values, or any combination thereof. The transmitted data values may be a measured variable and/or a controlled variable. In some embodiments, the controlled variable may be temperature, humidity, etc. The measured variable and controlled variable are not limited to those specifically enumerated. The data values may be transmitted using a wireless communications protocol. In some embodiments, the wireless communications protocol used is ZigBee. In other embodiments, communications protocols may include WiFi, Bluetooth, NFC, etc. System 600 is shown to include wireless device 408 and BMS controller 366. Wireless device 408 is shown to include a sensor 602, a low-power microcontroller 604, and a wireless radio chip 614.

Sensor 602 may measure a variable of interest and provide measured data values to low-power microcontroller 604. Sensor 602 may be a temperature sensor, humidity sensor, enthalpy sensor, pressure sensor, lighting sensor, flow rate sensor, voltage sensor, valve position sensor, load sensor, resource consumption sensor, and/or any other type of sensor capable of measuring a variable of interest in BMS 400. In some embodiments, sensor 602 includes a plurality of sensors, and wireless device 408 may generate multiple messages or generate one message, each containing measurements for multiple measured variables. In some embodiments, sensor 602 is a single sensor and wireless device 408 may generate a single message containing multiple measurements containing data for the singular measured variable.

Sensor 602 may be any battery-operated sensor, such that sensor 602 does not need an external power source. In some embodiments, sensor 602 receives power from a battery within wireless device 408. In other embodiments, sensor 602 may use any power source such as chemical, solar, biological cells, etc. In some embodiments, sensor 602 may utilize an external power source, and may be connected to the power source via a wired connection. In other embodiments, sensor 602 may utilize technology such as wireless charging.

Sensor 602 may collect data values continuously at regular intervals. For example, sensor 602 may collect temperature data in a particular zone of a building every minute. In some embodiments, sensor 602 may collect multiple values for multiple variables at the same time, or at different frequencies. For example, sensor 602 may be a combination sensor, and may collect air temperature data every minute and local humidity every five minutes. The length of time between data collections by sensor 602 is referred to herein as the measurement period and/or the measurement interval.

Low-power microcontroller 604 may facilitate variable SOD analysis and generate a message containing one or more values of the measured variable. Low-power microcontroller 604 may be any controller component capable of processing data. For example, microcontroller 604 may include a processing circuit comprising a processor capable of receiving, processing, and outputting data. In some embodiments, microcontroller 604 comprises memory capable of storing data. In other embodiments, microcontroller 604 may not include a memory. Various embodiments of low-power microcontroller 604 are described in greater detail below. Low-power microcontroller 604 provides the message to wireless radio chip 614, which wirelessly transmits the message to BMS controller 366.

BMS controller 366 is shown to include a wireless radio chip 616, a message parser 526, and a feedback controller 418. Wireless radio chip 616 receives messages from wireless radio chip 614 of wireless sensor 408 and provides the messages to message parser 416. Message parser 416 extracts individual data values from the message and provides the data values to feedback controller 418. Feedback controller 418 uses the data values as inputs to a control algorithm to generate a control output (e.g., a control signal for building equipment that operate to affect the measured variable). In some embodiments, BMS controller 366 includes some or all of the features described with reference to FIGS. 3-4. In some embodiments, system 600 may include more, fewer, and/or different components than those specifically shown in FIG. 6B.

Low-power microcontroller 604 is shown to include noise threshold generator 606, transmission timer 608, value comparator 610, and message generator 612. Noise threshold generator 606 may generate a variable SOD noise threshold. In various embodiments, noise threshold generator 606 analyzes values of the measured variable to generate the variable SOD noise threshold. For example, noise threshold generator 606 may receive measured temperature values from sensor 602 and analyze the measured temperature values to determine a variable noise threshold. As discussed previously, the noise threshold may be dynamic and may change over time according to the received values of the measured variable. Measurements from sensor 602 are defined as:

$$\tilde{y}_t = y_t + \varepsilon_t$$

where $\tilde{y}_t$ is the measurement at a time t comprised of signal $y_t$ and random noise $\varepsilon_t$. System 600 may model the signal using a transfer function defined as:

$$Y(s) = \frac{R(s)G_c(s)G_p(s) + D(s)G_p(s)}{1 + G_c(s)G_p(s)}$$

where Y(s) is the measured variable, R(s) is the setpoint, $G_c(s)$ is the controller transfer function, $G_p$ (s) is the plant transfer function, and D(s) is the unmeasured disturbance (e.g., an outdoor air temperature, etc.). In various embodiments, the transfer function is associated with the control system illustrated in FIG. 6A. A discrete time representation of $y_t$ for the transfer function above may be defined as:

$$y_t = \alpha y_{t-1} + u_t$$

where $$\alpha = e^{\frac{-\Delta t}{\tau}},$$

$y_{t-1}$ is the signal one time unit previous, and $u_t$ is the combined disturbance and setpoint signals. Therefore, a model for estimating the noise component $\varepsilon_t$ in the measured signal $\tilde{y}_t$ may be defined as:

$$\tilde{y}_t = \alpha y_{t-1} + u_t + \varepsilon_t$$

The measured signal $\tilde{y}_t$ may be differenced to isolate the random noise $\varepsilon_t$ and a variance of the difference may be defined as:

$$\text{Var}(\nabla^2 \tilde{y}) \approx \text{Var}(\nabla^2 \varepsilon) = 6\sigma_\varepsilon^2$$

where $\sigma_\varepsilon$ is the standard deviation of the random noise. The measured signal $\tilde{y}_t$ may be differenced once, twice, or numerous times (e.g., three times, five times, etc.) to isolate the random noise $\varepsilon_t$. System 600 may determine a mean absolute deviation (MAD) of the difference of the random noise $\varepsilon_t$ using an exponentially-weighted moving average (EWMA), defined as:

$$m_t = m_{t-1} + \lambda(|\nabla_t^2 \tilde{y}| - m_{t-1})$$

where $m_t$ is the EWMA estimate of the MAD value of $\nabla_t^2 \tilde{y}$ at sample t. System 600 may generate a variable threshold using the equation defined below as:

$$\hat{\sigma}_{t,\varepsilon} \approx m_t \sqrt{\frac{\pi}{12}}$$

where $\hat{\sigma}_{t,\varepsilon}$ is the variable threshold at sample t. In various embodiments, noise threshold generator 606 generates variable threshold $\hat{\sigma}_{t,\varepsilon}$ for each measured value received from sensor 602. The variable threshold $\hat{\sigma}_{t,\varepsilon}$ may represent an estimated noise variance of the measured signal $\tilde{y}_t$. In various embodiments the variable threshold $\hat{\sigma}_{t,\varepsilon}$ is used by value comparator 610 and/or message generator 612 to determine a transmission period and/or transmission interval, and/or to trigger message generation and/or message transmission of the measured signal $\tilde{y}_t$.

Transmission timer 608 may be a circuit of low-power microcontroller 604 configured to monitor and control timing of wireless transmissions from device 408. In some embodiments, transmission timer 608 monitors and controls timing of wireless transmissions to BMS controller 366. Transmission timer 608 may be configured to identify or determine a transmission period and/or transmission interval for wireless device 408 based on the original transmission interval used by feedback controller 418. As defined herein, the transmission interval may be the time that elapses between transmissions from wireless device 408. In some embodiments, the transmission interval is longer than the controller update interval used by feedback controller 418. For example, if the controller update interval used by feedback controller 418 is one minute, the transmission interval may be four minutes. The controller update interval may be the period of time between iterations of the control algorithm used by feedback controller 418. At the beginning of each controller update interval, feedback controller 418 may be provided an updated input value. In other embodiments, the transmission interval is equal to the controller update used by feedback controller 418.

The transmission interval may be determined by wireless device 408 to provide a compromise between power savings and accuracy of the values output by device 408. In some embodiments, the transmission interval is determined by transmission timer 608. Additionally or alternatively, the transmission interval may be determined by value comparator 610. For example, value comparator 610 may compare a measured value from sensor 602 to a threshold determined by noise threshold generator 606 to trigger transmission of the measured value. Transmission timer 608 may adjust a transmission interval of wireless device 408 based on instructions from value comparator 610. For example, the regular transmission interval may be shortened if value comparator 610 determines that a measured value is significantly different than the noise threshold. Additionally or alternatively, transmission timer 608 may generate a control signal for message generator 612 based on a time since the last transmission. For example, transmission timer 608 may implement the following algorithm:

if $(t_t - t_{t-1} > t_{max}) \rightarrow$ transmit new data $\tilde{y}_t$;

else $\rightarrow$ do not transmit new data $\tilde{y}_t$ where $t_{max}$ is an integer constant. Choice of $t_{max}$ may facilitate a "heartbeat" from wireless device 408 to BMS controller 366.

The controller update interval may be shorter than the transmission interval such that multiple controller update intervals occur within a single transmission interval. In other embodiments, the controller update interval may be the same as the transmission interval. In some embodiments, the controller update interval may be no longer than one-tenth of the time constant of the controlled system. In other embodiments, the controller update interval may be any length of time (e.g., one-half, two-thirds, two times the time constant, etc.) of the controlled system. The time constant of the controlled space may characterize the frequency response of the system. For example, the time constant of a system may be 20 minutes; the controller update interval may be one-twentieth the time constant, or one minute. In some embodiments, the update interval is determined based on user or occupant preference. For example, a user may prefer for the controller update interval to be shorter to keep up with constantly changing conditions and maintain occupant comfort. A user may set the controller update interval to be longer to conserve battery life of wireless device 408 which may need to transmit more frequently with a shorter update interval. In various embodiments, a user may adjust $t_{max}$ to align with the update interval and/or to change a frequency of the heartbeat signal.

Referring still to FIG. 6B, low-power microcontroller 604 is shown to include value comparator 610. Value comparator 610 may be a circuit of microcontroller 604 configured to compare values of the measured variable. In some embodiments, value comparator 610 may compare a measured value to a previously measured value and/or to the noise threshold and make an operating decision based on the result of the comparison. For example, value comparator 610 may compare a mathematical relationship between the measured value and a previously measured value (e.g., a difference, a ratio, etc.) to the noise threshold. As a concrete example, value comparator 610 may (i) find a difference between the presently measured value and the previously transmitted value and (ii) compare the difference to the variable threshold $\hat{\sigma}_{t,\varepsilon}$ determined by noise threshold generator 606 to (iii) determine whether to transmit the presently measured value. Value comparator 610 may implement the following algorithm:

$$\text{if}(|\tilde{y}_t - \tilde{y}_{t-1}| > A\hat{\sigma}_{t,\varepsilon}) \rightarrow \text{transmit new data } \tilde{y}_t;$$

$$\text{else} \rightarrow \text{do not transmit new data } \tilde{y}_t$$

where A is an integer constant. In some embodiments, A=6. However, A may take other values and may be adjusted by a user. In some embodiments, A is adjusted by system 600 to improve performance. For example, a machine learning algorithm may adjust values of A to maximize occupant comfort while minimizing transmission frequency.

In some embodiments, value comparator 610 compares multiple measured values at different times to determine a rate of change. The difference and/or rate of change may be used to make operating decisions. For example, if the difference and/or rate of change is larger than a predetermined threshold, wireless device 408 may send a new measured value to BMS controller 366 before the beginning of the next transmission interval. Additionally or alternatively, any other mathematical relationship may be used. For example, value comparator 610 may determine a ratio between measured values at different times and use the ratio to make operating decisions.

In some embodiments, value comparator 610 may communicate with transmission timer 608 to transmit a measured value before the beginning of the next transmission interval to BMS controller 366 based on a calculated rate of change. For example, if value comparator 610 determines that the rate of change of the zone temperature is larger than a predetermined threshold, value comparator 610 may communicate with transmission timer 608 to send a measured value before the beginning of the next transmission interval. In some embodiments, wireless device 408 may make control decisions based on a mathematical relationship (e.g., a difference, a ratio, etc.) between a predicted value at a time and its measured value at that time. For example, value comparator 610 may calculate the difference between the predicted value and the measured value of a flow rate, and upon determining that the difference is larger than a predetermined threshold value, may communicate with transmission timer 608 to send a measured value to BMS controller 366 before the beginning of the next transmission interval.

Still referring to FIG. 6B, low-power microcontroller 604 is shown to include message generator 612. Message generator 612 may be a circuit of microcontroller 604 configured to generate a message for transmitting from device 408. In some embodiments, message generator 612 may generate a message including one or more measured values of a measured variable for transmitting from device 408 to BMS controller 366. In various embodiments, message generator 612 generates a message in response to control signals received from transmission timer 608 and/or value comparator 612. For example, message generator 612 may receive (i) an indication that the presently measured value exceeds the variable threshold from value comparator 610 and (ii) an indication that the time elapsed since the last data transmission exceeds a minimum time and (iii) determine in response to generate and/or transmit (e.g., via wireless radio chip 614) a message. In various embodiments, message generator 612 implements the following algorithm:

$$\text{if}[(|\tilde{y}_t - \tilde{y}_{t-1}| > A\hat{\sigma}_{t,\varepsilon} \text{ AND } t_t - t_{t-1} > t_{min}) \text{ OR } t_t - t_{t-1} > t_{max}]$$

$$\rightarrow \text{transmit new data } \tilde{y}_t;$$

$$\text{else} \rightarrow \text{do not transmit new data } \tilde{y}_t$$

Message generator 612 may generate messages such that included values are sequential. In some embodiments, message generator 612 may generate messages with indicators for the order in which the values should be read. For example, a message may be a data packet containing multiple measured values, each with a header indicating its temporal order. In other embodiments, message generator 612 may generate messages with the values in the order in which each value is to be read and/or applied as an input to feedback controller 418.

Message generator 612 may generate messages such that no changes need to be made to the control algorithm of BMS controller 366 in order to receive the messages. For example, BMS controller 366 does not need to include a deadband to prevent oscillations. In some embodiments, message generator 612 may generate messages such that few changes need to be made to the control algorithm of BMS controller 366 in order to receive the messages. Message generator 612 may generate messages with commands or control data for transmitting to BMS controller 366.

Still referring to FIG. 6B, wireless device 408 and BMS controller 366 are shown to include wireless radio chips 614 and 616. In some embodiments, the wireless communications protocol used is ZigBee. Other communications protocols include WiFi, Bluetooth, NFC, etc. In some embodiments, other communications interfaces and components may be included, such as a wired connection. Wireless radio chips 614 and 616 may contain transceivers capable of transmitting and receiving data through an antenna. Wireless radio chips 614 and 616 may be different chips and may use different hardware while using the same wireless communications protocol. Wireless radio chips 614 and 616 may operate using any frequency interface, such as RF. Chips 614 and 616 may use frequencies outside of the RF range, and may not be radio chips. In some embodiments, chips 614 and 616 may communicate using other frequency ranges, such as IR. Chips 614 and 616 may utilize any communications interface, and are not limited to those specifically enumerated.

Still referring to FIG. 6B, BMS controller 366 is shown to include message parser 416 and feedback controller 418. These components may be the same or similar as previously described with reference to FIG. 4. For example, message parser 416 may parse messages generated by message generator 612 and received by BMS controller 366. In some embodiments, messages are received directly by message parser 416. Message parser 416 may communicate with feedback controller 418. In some embodiments, message parser 416 parses a message, extracts a plurality of data values from the message, and provides the data values to feedback controller 418 at regular intervals.

Message parser 416 may receive messages at the transmission interval, which may be longer than the controller update interval. Message parser 416 may parse the messages to extract a data value for each controller update interval within the transmission interval. For example, message parser 416 may receive a message with six values. Message parser 416 may extract the six values from the message and provide one of the values to feedback controller 418 at the beginning of each controller update interval. Feedback controller 418 may receive inputs from message parser 416 to make control decisions for BMS controller 366. In some embodiments, feedback controller 418 generates control data and provides the control data BMS subsystems 420 (e.g., directly or via BMS interface 404).

Figure 7A:
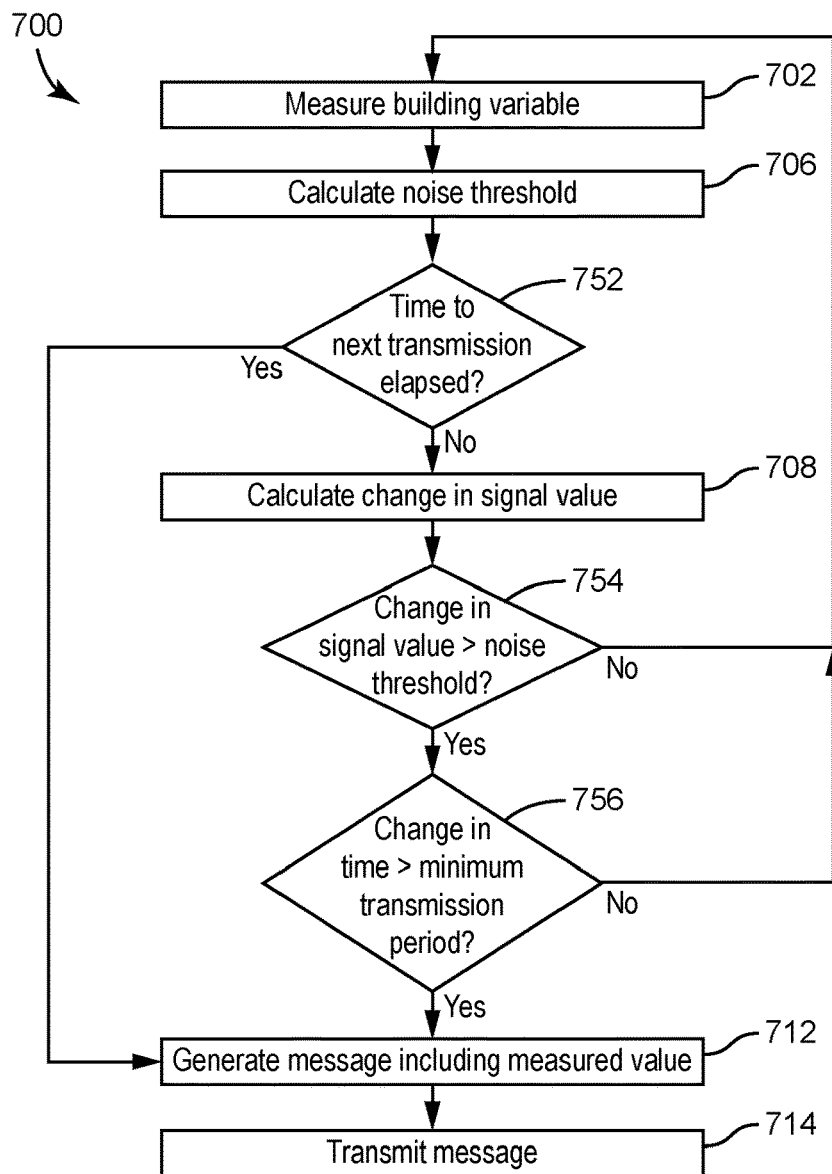
FIG. 7A is a flowchart of a process for performing variable SOD analysis, according to an exemplary embodiment.

Referring now to FIG. 7A, a process 700 of determining transmission timing based on a variable SOD threshold is shown. In various embodiments, wireless device 400 performs process 700. At step 702, sensor 602 measures a building variable. The building variable may be a flow rate, temperature, humidity, barometric pressure, and/or any other parameter associated with a space. In some embodiments, step 702 includes updating the variable SOD threshold based on the measured variable. At step 706, system 600 calculates an updated variable SOD threshold. At step 752, transmission timer 608 determines whether a time to next transmission has elapsed. In various embodiments, step 752 includes determining whether $t_r-t_{r-1}>t_{max}$. If time to next transmission has elapsed (e.g., the result of step 752 is "Yes"), then transmission timer 608 may send a control signal to message generator 612 to cause message generator 612 to generate a message including the measured value (e.g., step 712). If the result of step 752 is "No," then value comparator 610 calculates a change in signal value (e.g., step 708). In various embodiments, step 708 includes calculating $|\tilde{y}_t-\tilde{y}_{t-1}|$.

At step 754, value comparator 610 determines whether the change in signal value is greater than the variable SOD noise threshold. For example, value comparator 610 may determine whether $|\tilde{y}_t-\tilde{y}_{t-1}|>A\hat{\sigma}_{t,\epsilon}$. If the change in signal value is less than the variable SOD noise threshold (e.g., the result of step 754 is "No"), then the process 700 may restart at step 702. If the result of step 754 is "Yes," then transmission timer 608 may determine whether a change in time is greater than a minimum transmission period (e.g., step 756). In various embodiments, step 756 includes determining whether $t_r-t_{r-1}>t_{min}$. If the result of step 756 is "No," then the process 700 may restart at step 702. If the result of step 756 is "Yes," then value comparator 610 may send a control signal to message generator 612 to cause message generator 612 to generate a message including the measured value (e.g., step 712). In various embodiments, message generator 612 must receive multiple control signals to generate a message. For example, message generator 612 may receive (i) an indication that the presently measured value exceeds the variable threshold from value comparator 610 and (ii) an indication that the time elapsed since the last data transmission exceeds a minimum time. At step 714, message generator 612 causes wireless radio chip 614 to transmit the message. In some embodiments, wireless radio chip 614 transmits messages at a regular interval (e.g., a transmission period). Process 700 may then repeat at step 702. In some embodiments, process 700 is run every minute. In various embodiments, $t_r$ and/or $t_{r-1}$ may be updated based on the transmission time. Furthermore, $\tilde{y}_{t-1}$ may be updated based on the value of the transmitted variable. In various embodiments, wireless radio chip 616 receives the transmission from wireless radio chip 614 and uses the received value as an input for feedback controller 418.

Figure 7B:
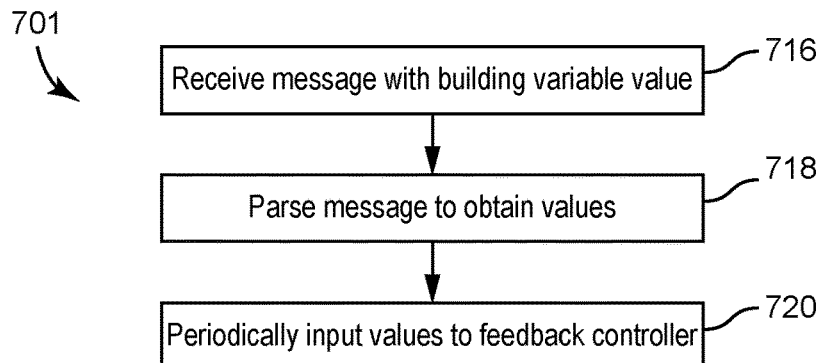
FIG. 7B is a flowchart of a process for utilizing a received measured value, according to an exemplary embodiment.

Referring now to FIG. 7B, a process 701 of utilizing the received value is shown, according to an exemplary embodiment. In various embodiments, BMS controller 366 performs process 701. BMS controller 366 may perform process 701 in response to receiving a transmission from wireless device 408. At step 716, wireless radio chip 616 receives a message with the building variable value. At step 718, message parser 416 parses the message to obtain values. For example, the values may include temperature values, flow values, humidity values, barometric pressure values, and any other values relating to a space. In various embodiments, the values correspond to values measured by sensor 602. At step 720, BMS controller 366 applies the values as input for feedback controller 418. In some embodiments, the values are input to feedback controller 418 at a regular interval (e.g., an update interval). In various embodiments, process 701 repeats at step 716 for every received transmission from wireless device 408.

Figure 8:
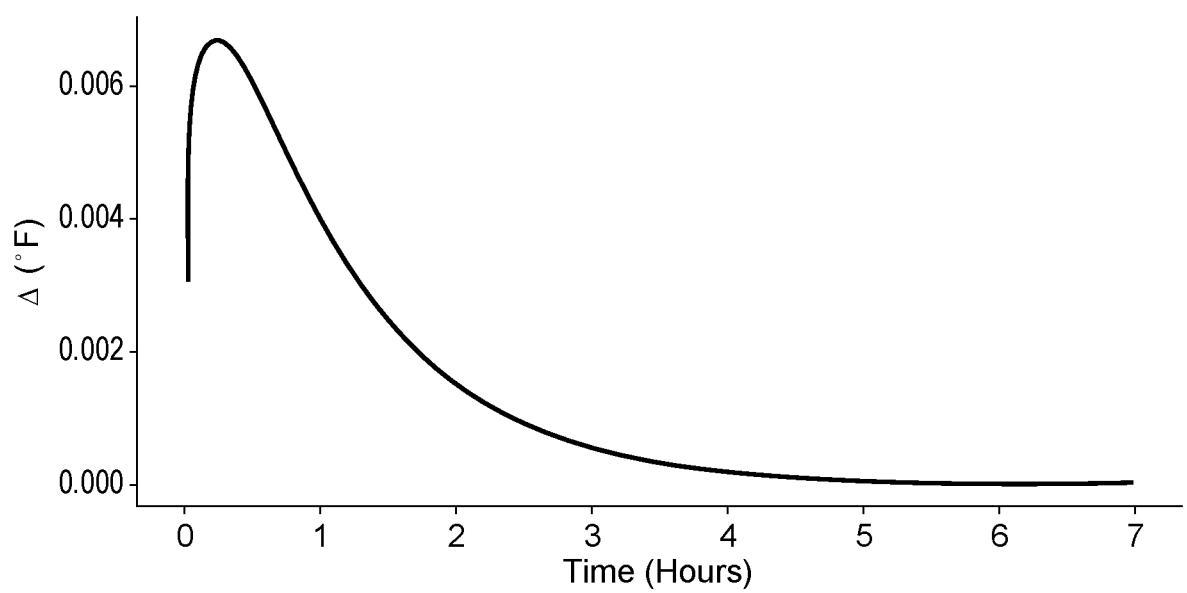
FIG. 8 is a diagram of a difference in a measured value over time for a SOD system, according to an exemplary embodiment.

Referring now to FIG. 8, a graph of the difference between the measured value and the previously transmitted value during a setpoint change is shown. FIG. 8 graphically illustrates the calculation $|\tilde{y}_t-\tilde{y}_{t-1}|$ over time. In various embodiments, a setpoint change occurs around t=0. As BMS controller 366 responds, the difference between the measured value and the previously transmitted value decreases toward zero. Therefore, as the temperature of the space reaches the new setpoint temperature, wireless device 408 transmits fewer measured values, thereby saving battery power.

Figure 9:
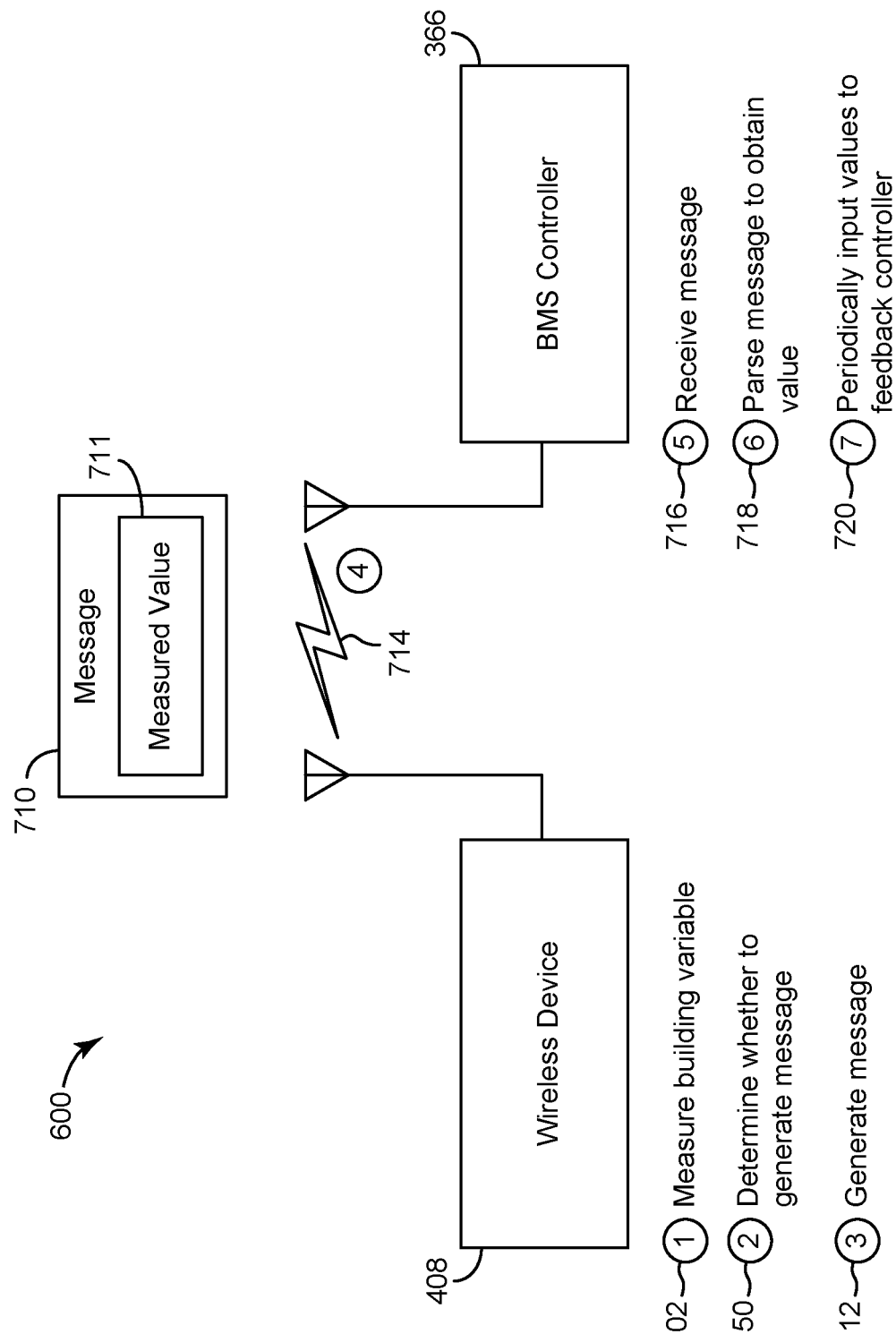
FIG. 9 is a block diagram illustrating the system of FIG. 6B implementing SOD analysis to control a system, according to an exemplary embodiment.

Referring now to FIG. 9, an illustration of system 600 performing process 700 and process 701 is shown. At step 702, sensor 602 measures a building variable. For example, the building variable may be a flow rate, temperature, humidity, barometric pressure, and any other variable associated with a space. At step 750, wireless device 408 determines whether to generate a message. In various embodiments, step 750 includes performing steps 752, 706, 708, and 754. In some embodiments, step 750 includes more, fewer, or different steps. In response to determining that a message should be generated, wireless device 408 generates a message 710 (e.g., step 712). The message 710 may be generated according to a wireless communication protocol. For example, message 710 may conform to a Zigbee protocol, a Z-wave protocol, and/or any other wireless communication protocol. In various embodiments, message 710 includes measured value 711. In some embodiments, message 710 includes a number of measured values 711. Measured value 711 may be the value measured by sensor 602. At step 714, wireless device 408 transmits message 710 to BMS controller 366. At step 716, BMS controller 366 receives message 710. At step 718, BMS controller 366 parses message 710 to obtain measured value 711. In some embodiments, BMS controller 366 parses message 710 to obtain a number of measured values 711. At step 720, BMS controller 366 inputs measured value 711 into feedback controller 418. In various embodiments, measured values 711 are fed into feedback controller 418 at a regular interval (e.g., an update interval).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of controlling signal transmission in a building control system, the method comprising:
   measuring a plurality of signal values associated with an environmental variable using a sensor of a wireless device;
   dynamically determining, by the wireless device, a noise threshold based on the plurality of signal values;
   combining a first signal value and a second signal value of the plurality of signal values using a mathematical relationship to determine a result associated with the first signal value and the second signal value; and
   periodically transmitting the first signal value from the wireless device to a controller in response to the result exceeding the noise threshold;
   wherein the environmental variable is a temperature.

2. The method of claim 1, wherein the wireless device is a thermostat.

3. The method of claim 1, wherein the wireless device is a battery operated device.

4. The method of claim 1, wherein the controller applies the first signal value as input to a control algorithm that operates to control the environmental variable.

5. The method of claim 1, wherein the noise threshold is a dynamic noise threshold that changes over time based on subsequent measurements of the environmental variable, wherein the dynamic noise threshold models a level of signal noise present in the plurality of signal values over time.

6. The method of claim 1, wherein the result is a difference between the first signal value and the second signal value.

7. The method of claim 1, wherein the result is a ratio between the first signal value and the second signal value.

8. A wireless device, comprising:
   a sensor configured to measure an environmental variable;
   a wireless radio configured to wirelessly transmit a message; and
   a processing circuit having a processor and memory, the memory storing instructions that, when executed by the processor, cause the processing circuit to:
   receive, from the sensor, a plurality of signal values associated with the environmental variable;
   dynamically determine a noise threshold based on the plurality of signal values;
   combine a first signal value and a second signal value of the plurality of signal values using a mathematical relationship to determine a result associated with the first signal value and the second signal value; and
   cause the wireless radio to transmit the first signal value in response to the result exceeding the noise threshold;
   wherein the environmental variable is a temperature.

9. The wireless device of claim 8, wherein the wireless radio transmits the first signal value to a controller.

10. The wireless device of claim 9, wherein the controller applies the first signal value as input to a control algorithm that operates to control the environmental variable.

11. The wireless device of claim 8, wherein the wireless device is a thermostat.

12. The wireless device of claim 8, wherein the wireless device is battery operated.

13. The wireless device of claim 8, wherein the noise threshold is a dynamic noise threshold that changes over time based on subsequent measurements of the environmental variable, wherein the dynamic noise threshold models a level of signal noise present in the plurality of signal values over time.

14. The wireless device of claim 8, wherein the result is a difference between the first signal value and the second signal value.

15. The wireless device of claim 8, wherein the result is a ratio between the first signal value and the second signal value.

16. A building management system (BMS), comprising:
   a controller configured to control an environmental variable of a building; and a wireless device configured to:
   measure a plurality of signal values associated with the environmental variable;
   dynamically determine a noise threshold based on the plurality of signal values;
   combine a first signal value and a second signal value of the plurality of signal values using a mathematical relationship to determine a result associated with the first signal value and the second signal value; and
   transmit the first signal value to the controller in response to the result exceeding the noise threshold;
   wherein the environmental variable is a temperature.

17. The building management system (BMS) of claim 16, wherein in response to receiving the first signal value from the wireless device, the controller is further configured to apply the first signal value as input to a control algorithm that operates to control the environmental variable of the building.

18. The building management system (BMS) of claim 16, wherein the wireless device is a thermostat.

19. The building management system (BMS) of claim 18, wherein the thermostat is battery operated.

20. The building management system (BMS) of claim 19, wherein the first signal value is a current measurement of the temperature and the second signal value is a past measurement of the temperature.

21. The building management system (BMS) of claim 16, wherein the noise threshold is a dynamic noise threshold that changes over time based on subsequent measurements of the environmental variable, wherein the dynamic noise threshold models a level of signal noise present in the plurality of signal values over time.

22. The building management system (BMS) of claim 16, wherein the result is a difference between the first signal value and the second signal value.

23. The building management system (BMS) of claim 16, wherein the result is a ratio between the first signal value and the second signal value.

* * * * *